(12) United States Patent
Kim et al.

(10) Patent No.: US 11,553,385 B2
(45) Date of Patent: *Jan. 10, 2023

(54) DATA TRANSMISSION METHOD PERFORMED BY BASE STATION IN WIRELESS COMMUNICATION SYSTEM, AND APPARATUS USING SAME

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,808

(22) Filed: Oct. 16, 2020

(65) Prior Publication Data
US 2021/0037440 A1 Feb. 4, 2021

Related U.S. Application Data

(63) Continuation of application No. 16/064,695, filed as application No. PCT/KR2017/004586 on Apr. 28, 2017, now Pat. No. 10,841,847.

(Continued)

(51) Int. Cl.
*H04W 36/08* (2009.01)
*H04W 76/27* (2018.01)
(Continued)

(52) U.S. Cl.
CPC .......... *H04W 36/08* (2013.01); *H04W 76/22* (2018.02); *H04W 76/27* (2018.02); *H04W 48/20* (2013.01);
(Continued)

(58) Field of Classification Search
CPC ..... H04W 36/08; H04W 76/22; H04W 48/20; H04W 68/02
See application file for complete search history.

(56) References Cited

U.S. PATENT DOCUMENTS 8,594,011 B2 11/2013 Wang et al.
10,841,847 B2 * 11/2020 Kim ...................... H04W 36/08
(Continued)

FOREIGN PATENT DOCUMENTS

CN 104581947 A 4/2015
WO 2014/119858 A1 8/2014

OTHER PUBLICATIONS

Ralf Kreher et al. "E-UTRAN/EPC Signaling", In: "LTE Signaling, Troubleshooting and Performance Measurement", Oct. 30, 2015, John Wiley & Sons, Ltd., XP055635972.
(Continued)

*Primary Examiner* — Mohammad S Anwar
(74) *Attorney, Agent, or Firm* — Dentons US LLP

(57) ABSTRACT

Provided are a data transmission method performed by a base station in a wireless communication system, and an apparatus using the method. The base station transmits a message requesting information for data transmission to a second base station and receives, from the second base station, a response message to the message requesting the information for data transmission, wherein the information for data transmission is to transmit data on a terminal in a light connection state.

12 Claims, 15 Drawing Sheets

Related U.S. Application Data

(60) Provisional application No. 62/413,490, filed on Oct. 27, 2016, provisional application No. 62/403,016, filed on Sep. 30, 2016, provisional application No. 62/359,219, filed on Jul. 7, 2016, provisional application No. 62/350,722, filed on Jun. 16, 2016, provisional application No. 62/329,215, filed on Apr. 29, 2016.

(51) Int. Cl.

| | | |
|---|---|---|
| *H04W 76/22* | (2018.01) | |
| *H04W 88/16* | (2009.01) | |
| *H04W 68/02* | (2009.01) | |
| *H04W 88/08* | (2009.01) | |
| *H04W 48/20* | (2009.01) | |
| *H04W 76/19* | (2018.01) | |
| *H04W 92/20* | (2009.01) | |

(52) U.S. Cl.
CPC ............ *H04W 68/02* (2013.01); *H04W 76/19* (2018.02); *H04W 88/08* (2013.01); *H04W 88/16* (2013.01); *H04W 92/20* (2013.01)

(56) References Cited

U.S. PATENT DOCUMENTS

| | | | | |
|---|---|---|---|---|
| 2009/0325578 A1 | 12/2009 | Li | .................... | H04W 36/0055 455/436 |
| 2010/0195621 A1 | 8/2010 | Kekki | .................. | H04W 48/17 370/332 |
| 2011/0269464 A1 | 11/2011 | Xu | .................... | H04W 36/0033 455/436 |
| 2015/0141015 A1 | 5/2015 | Zhang | ............... | H04W 36/0061 455/436 |
| 2015/0156660 A1 | 6/2015 | Luo | ........................ | H04W 8/02 370/230 |
| 2015/0195788 A1 | 7/2015 | Au et al. | | |
| 2015/0341984 A1 | 11/2015 | Wang | .................... | H04W 76/10 370/329 |
| 2015/0373584 A1 | 12/2015 | Hong | | |

OTHER PUBLICATIONS

Huawei, China Telecom, HiSilicon, "RAN initiated paging optimization in light connection", 3GPP TSG RAN WG2 Meeting #93bis, Apr. 11-15, 2016, R2-162277.

Huawei, China Telecom, HiSilicon, "General principles and paging optimization in light connection", 3GPP TSG RAN NG2 Meeting #93bis, Apr. 11-15, 2016, R2-162520.

Huawei, China Telecom, "General consideration on light connection", 3GPP TSG-RAN WG3 Meeting #91bis, Apr. 11-14, 2016, R3-160655.

Huawei, "Motivation for new WI on Light Connection in LTE", RP-160301, 3GPP TSG RAN Meeting #71, Goteborg, Sweden, Mar. 1, 2016.

Huawei, "New WI proposal: Signalling reduction to enable light connection for LTE", RP-160499, 3GPP TSG RAN Meeting #71, Goteborg, Sweden, Mar. 2, 2016.

\* cited by examiner

DATA TRANSMISSION METHOD PERFORMED BY BASE STATION IN WIRELESS COMMUNICATION SYSTEM, AND APPARATUS USING SAME

CROSS-REFERENCE TO RELATED APPLICATIONS

This application is a continuation application of U.S. patent application Ser. No. 16/064,695 filed on Jun. 21, 2018, which is the National Stage filing under 35 U.S.C. 371 of International Application No. PCT/KR2017/004586 filed on Apr. 28, 2017, which claims the benefit of U.S. Provisional Applications No. 62/329,215 filed on Apr. 26, 2016, No. 62/350,722 filed on Jun. 16, 2016, No. 62/359,219 filed on Jul. 7, 2016, No. 62/403,016 filed on Sep. 30, 2016 and No. 62/413,490 filed on Oct. 27, 2016, the contents of which are all hereby incorporated by reference herein in their entirety.

BACKGROUND OF THE INVENTION

Field of the Invention

The present invention relates to wireless communication, and more particularly, to a method for transferring data, performed by a base station in a wireless communication system, and the base station using the method.

Related Art $3^{rd}$ generation partnership project (3GPP) is a system standard satisfying requirements of international mobile telecommunication (IMT)-advanced, and provides LTE-advanced (LTE-A) which is improved from long term evolution (LTE) based on orthogonal frequency division multiple access (OFDMA)/single carrier-frequency division multiple access (SC-FDMA) transmission.

At present, there is an ongoing development of an LTE-enhanced technology further improved from LTE-A and a new radio access technology (RAT) (NR) aiming at capacity/transfer rate increase at a newly allocated high frequency band.

The LTE-enhanced technology implies an LTE evolution technology considering 3GPP specifications (e.g., Release 14/15) determined after 3GPP Release 12/13, and may operate in a cellular band currently used by a mobile communication system. On the other hand, the new RAT is a new technology developed by targeting a newly allocated frequency band, and may be a technology in which some functions are also applicable to a low frequency band although it operates at a high frequency band (e.g., at least 10 GHz) to obtain high capacity. In a $5^{th}$ generation (5G) radio access technology, the LTE-enhanced and the new RAT may be used in an interworking/combined manner.

Meanwhile, in the aforementioned future radio communication system, a terminal may be light-connected to a network. The terminal in a light connection state may maintain a connection (e.g., S1 connection) between a base station and a core network while deactivating a connection (e.g., RRC connection) between the terminal and the base station (e.g., eNB). In this case, a context for the terminal in the light connection state may be in a state of being stored both in the terminal and the base station. The base station may be a base station (which may be referred to as an eNB) using evolved universal mobile telecommunications system (UMTS) terrestrial radio access (E-UTRA) or a base station (which may be referred to as a gNB) using a new radio access technique (NR).

In the light connection state, although the connection between the terminal and the base station is deactivated, a connection between the base station and a mobility management entity (MME) (in case of NR, between the base station and an access and mobility management function (AMF)) is activated. Therefore, when downlink data arrives, the MME may directly transmit the downlink data to the base station without having to newly transmit an S1 (in case of NR, NG) paging message to the base station.

On the other hand, since the terminal has mobility, the terminal may move to coverage of another base station other than the aforementioned base station. In this case, the base station may transmit an X2 (in case of NR, an interface between base stations (gNBs) is referred to as Xn) paging request message to neighboring different base stations. The neighboring different base station which has received the X2/Xn paging request message transmits a paging message to the terminal via a Un interface. When the terminal responds thereto, this is informed to the base station.

There is a need to define a specific method by which downlink data for the terminal is forwarded between the base station and the different base station after the process of exchanging the paging message between the base stations. Accordingly, the present invention proposes a method by which the base station can forward data for the terminal in a light connection state, and an apparatus thereof.

SUMMARY OF THE INVENTION

The present invention provides a method for transferring data, performed by a base station in a wireless communication system, and the base station using the method.

In one aspect, provided is a data transfer method performed by a first base station in a wireless communication system. The method includes transmitting a message requesting information for data transfer to a second base station and receiving, from the second base station, a response message for the message requesting the information for data transfer. The information for data transfer is for transferring data on a UE (User Equipment) in a light connection state.

The UE in the light connection state may be a UE, of which an RRC (Radio Resource Control) connection with a base station is deactivated and a connection state with a CN (Core Network) is maintained, and the base station and the UE store a UE context of the UE.

The first base station may provide the second base station with information indicating an address to which the data is to be transferred.

The message for requesting the information for data transfer may be information for requesting a downlink GTP (GPRS Tunneling Protocol) tunnel endpoint IE (Information Element).

The message for requesting the information for data transfer may comprise at least one of an E-RAB (E-UTRAN Radio Access Bearer) ID (Identity) and an E-RAB level QoS (Quality of Service) parameter IE (Information Element).

Upon receiving the message for requesting the information for data transfer, the second base station may transmit a downlink GTP tunnel endpoint IE to the first base station.

The downlink GTP tunnel endpoint IE may comprise information that informs a path for data transfer between the second base station and a P-GW (PDN-Gateway).

The first base station may transmit a paging request to the second base station.

If the UE is located inside coverage of the second base station, a paging response message including an ID (Identity) of the UE may be received from the second base station.

The first base station may transfer data for the UE to the second base station.

In another aspect, provided is a base station. The base station includes an RF (Radio Frequency) unit transmitting and receiving a radio signal and a processor operatively coupled to the RF unit. The processor is configured to transmit a message requesting information for data transfer to a second base station and receive, from the second base station, a response message for the message requesting the information for data transfer. The information for data transfer is for transferring data on a UE (User Equipment) in a light connection state.

According to the present invention, a base station can effectively forward data for a terminal in a new state which does not exist in the conventional technique, that is, a terminal in a light connection state. In addition, an overload generated in this process can be decreased when signals are exchanged between network entities such as the base station and an MME or the base station and an AMF.

DESCRIPTION OF EXEMPLARY EMBODIMENTS

Figure 1:
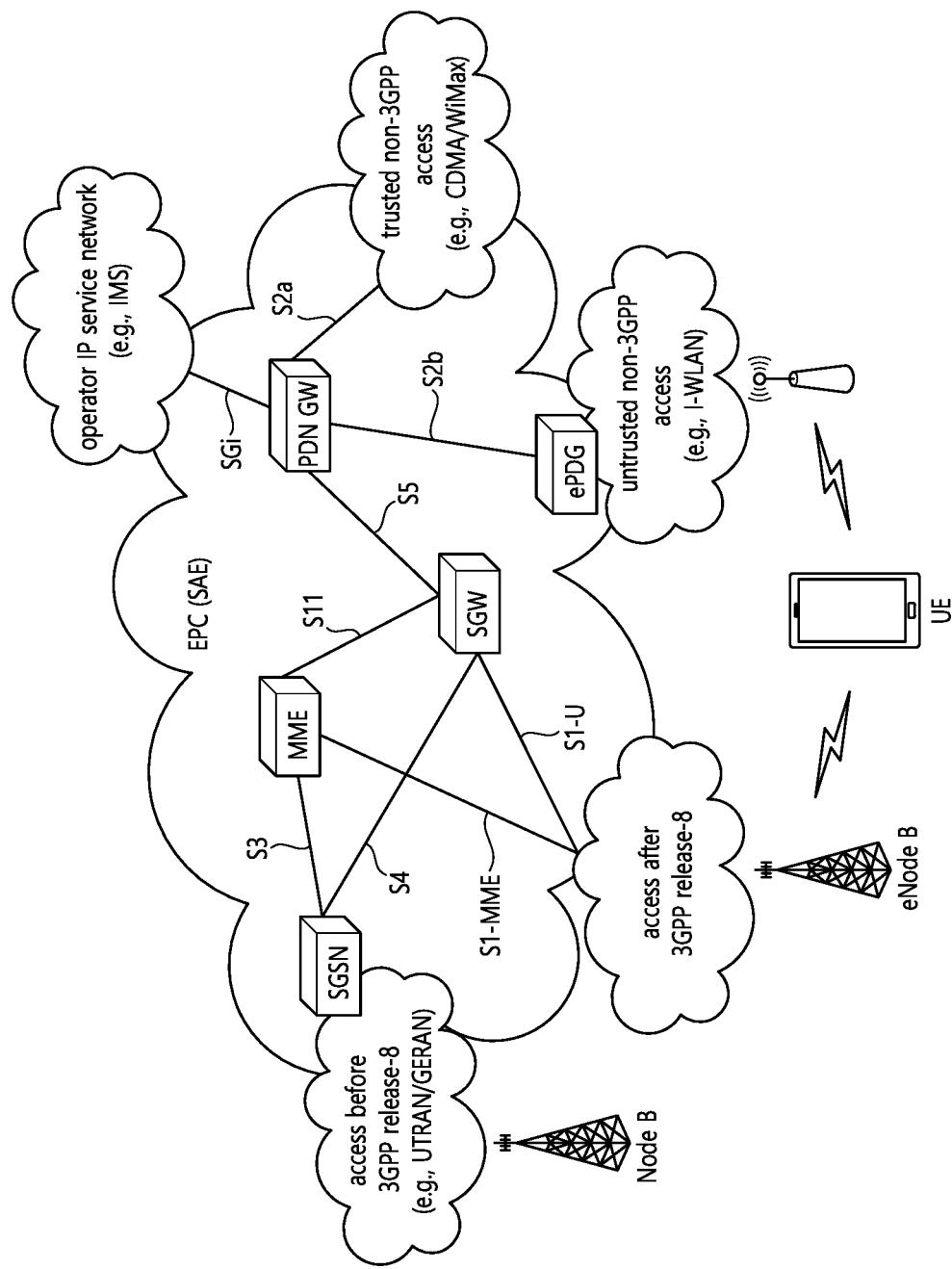
FIG. 1 is drawing simply exemplifying an evolved packet system (EPS) to which the present invention is applicable.

A base station may be a terminal node of a network for performing communication directly with a terminal. A specific operation described as being performed by the base station may be optionally performed by an upper node of the base station. That is, various operations performed for communication with the terminal in a network consisting of a plurality of network nodes including the base station may be performed by the base station or different network nodes other than the base station.

A base station (BS) may be replaced with other terms such as a fixed station, a Node B, an eNode B (eNB), a base transceiver system (BST), an access point (AP), a gNB, or the like.

A terminal may be fixed or mobile, and may be replaced with other terms such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, or the like.

Herein, a downlink (DL) implies communication from the BS to the terminal, and an uplink (UL) implies communication from the terminal to the BS. In the DL, a transmitter may be a part of the BS, and a receiver may be a part of the terminal. In the UL, the transmitter may be a part of the terminal, and the receiver may be a part of the BS.

A technique described below may be used in various radio access systems such as code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), or the like. The CDMA may be implemented with a radio technology such as universal terrestrial radio access (UTRA) or CDMA2000. The TDMA may be implemented with a radio technology such as global system for mobile communications (GSM), general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), or the like. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

For clarity, the following description will focus on the 3GPP LTE/LTE-A. However, technical features of the present invention are not limited thereto.

Terms that can be used in the present document are defined as follows.

UMTS (Universal Mobile Telecommunications System): A 3G mobile communication technique based on GSM (Global System for Mobile Communication), developed in 3GPP.

EPS (Evolved Packet System): A network system consisting of evolved packet core (EPC), which is a packet-switched core network based on IP (Internet Protocol), and an access network such as LTE, UTRAN, etc. It is a network evolved from UMTS.

NodeB: A BS of a UMTS network. It is installed outdoors, and its coverage corresponds to a macro cell.

eNodeB: A BS of an EPS network. It is installed outdoors, and its coverage corresponds to a macro cell.

UE (User Equipment): A user device. The UE may be a portable device such as a laptop, a mobile phone, a PDA (Personal Digital Assistant), a smart phone, a multimedia device, or the like, or may be a non-portable device such as a PC (Personal Computer), an in-vehicle device, or the like. In the context of MTC, the UE or the term 'UE' may refer to an MTC UE.

IMS (IP Multimedia Subsystem): A subsystem for providing a multimedia service on the basis of IP IMSI (International Mobile Subscriber Identity): A user identity assigned uniquely and globally in a mobile communication network MTC (Machine Type Communication): Communication performed by a machine without human intervention. It may be referred to as M2M (Machine to Machine) communication.

MTC UE (or MTC device): A UE (e.g., vending machine, meter reader, etc.) for performing an MTC function, with communication (e.g., communication with an MTC service via PLMN) via a mobile communication network.

MTC server: A server on a network for managing an MTC UE. It may exist inside or outside a mobile communication network. It may have an interface to which an MTC user is accessible. In addition, the MTC server may provide an MTC-related service to different servers (in a form of SCS (Services Capability Server)), or may be an MTC application server.

(MTC) application: A service (to which MTC is applied) (e.g., remote meter reading, volume movement tracking, weather observation sensors, etc.)

(MTC) application server: A server on a network in which an (MTC) application is executed.

MTC feature: A function of a network for supporting an MTC application. For example, MTC monitoring is a feature for preparing for a case where a device is lost in an MTC application such as remote meter reading or the like, and low mobility is a feature for an MTC application for an MTC UE such as a vending machine.

MTC user: An MTC user uses a service provided by an MTC server.

MTC subscriber: It is an entity which has a connection relation with a network operator and which provides a service to one or more MTC UEs.

MTC group: It shares at least MTC feature and implies a group of MTC UEs belonging to an MTC subscriber.

SCS (Services Capability Server): It is connected with a 3GPP network, as an entity for communicating with an MTC UE and an MTC-IWF (MTC InterWorking Function) on HPLMN (Home PLMN). The SCS provides capability for using one or more MTC applications.

External identifier: It is globally unique, as an identifier used by an external entity (e.g., an SCS or an application server) of a 3GPP network to indicate (or identify) an MTC UE (or a subscriber to which the MTC UE belongs). The external identifier consists of a domain identifier and a local identifier as described below.

Domain identifier: An identifier for identifying a domain in a control section of a mobile communication network operator. One operator may use a domain identifier for each service to provide access to different services.

Local identifier: An identifier used to estimate or acquire an IMSI (International Mobile Subscriber Identity). The local identifier must be unique in an application domain, and is managed by a mobile communication network operator.

RAN (Radio Access Network): A unit including a nodeB, an RNC (Radio Network Controller) controlling the nodeB, and an eNodeB in a 3GPP network. It exists in a UE end, and provides access to a core network.

HLR (Home Location Register)/HSS (Home Subscriber Server): A database having subscriber information in a 3GPP network. The HSS may perform a function of configuration storage, identify management, user status storage, or the like.

RANAP (RAN Application Part): An interface between nodes (i.e., MME (Mobility Management Entity)/SGSN (Serving GPRS (General Packet Radio Service) Supporting Node)/MSC (Mobile Switching Center)) for controlling an RAN and a core network.

PLMN (Public Land Mobile Network): A network configured to provide a mobile communication service to individuals. It may be configured in a distinctive manner for each operator.

NAS (Non-Access Stratum): A functional layer for exchanging signaling and traffic messages between a UE and a core network in UMTS and EPS protocol stacks. A main function thereof is to support mobility of the UE and to support a session management procedure for establishing and maintaining an IP connection between the UE and a PDN GW.

SCEF (Service Capability Exposure Function): An entity in a 3GPP architecture for service capability exposure which provides a means for reliably exposing a service and capability provided by a 3GPP network interface.

Hereinafter, the present invention will be described based on the terms defined above.

General Details of a System to which the Present Invention is Applicable

FIG. 1 is drawing simply exemplifying an evolved packet system (EPS) to which the present invention is applicable.

A network architecture of FIG. 1 is simply reconstructed from an architecture of an EPS including an evolved packet core (EPC).

The EPC is a core element of a system architecture evolution (SAE) for improving performance of 3GPP techniques. The SAE is a research project which determines a network architecture supporting mobility between various types of networks. The SAE aims to provide an optimized packet-based system such as, for example, supporting various radio access technologies based on IP and providing more improved data transmission capabilities.

Specifically, the EPC is a core network of an IP mobile communication system for a 3GPP LTE system, and can support packet-based real-time and non-real-time services. In the conventional mobile communication system (i.e., a 2G or 3G mobile communication system), a function of a core network is implemented through two distinctive sub-domains, that is, a circuit-switched (CS) sub-domain for voice and packet-switched (PS) sub-domain for data. However, in the 3GPP LTE system evolved from the 3G mobile communication system, the CS and PS sub-domains are unified into one IP domain. That is, in the 3GPP LTE system, a connection between UEs having an IP capability may be established through an IP-based BS (e.g., an evolved nodeB (eNodeB)), EPC, and application domain (e.g., IMS). That is, the EPC is an essential structure for implementing end-to-end IP services.

The EPC may include various constitutional elements, and FIG. 1 shows some parts thereof, i.e., a SGW (Serving Gateway) (or S-GW), PDN GW (Packet Data Network Gateway) (or PGW or P-GW), MME (Mobility Management Entity), SGSN (Serving GPRS (General Packet Radio Service) Supporting Node), and ePDG (enhanced Packet Data Gateway).

The SGW acts as a boundary between an RAN (Radio Access Network) and a core network, and is an element for maintaining a data path between an eNodeB and a PDN GW. In addition, when a UE moves across a region served by the eNodeB, the SGW serves as a local mobility anchor point. That is, packets may be routed through the SGW for mobility in an E-UTRAN (Evolved-UMTS (Universal Mobile Telecommunications System) Terrestrial Radio Access Network) defined after the E-UTRAN (Evolved-Universal Mobile Telecommunications System (UMTS) Terrestrial Radio Access Network defined after 3GPP Release-8). In addition, the SGW may serve as an anchor point for mobility with another 3GPP network (an RAN defined before 3GPP release-8, for example, UTRAN or GERAN (GSM (Global System for Mobile Communication)/EDGE (Enhanced Data rates for Global Evolution) Radio Access Network).

provided by a provider (i.e., operator) via various elements in an EPC based on not only a 3GPP access but also a non-3GPP access.

In addition, various reference points (e.g., S1-U, S1-MME, etc.) are shown in FIG. 1. In a 3GPP system, a conceptual link for connecting two functions existing in different function entities of the E-UTRAN and the EPC is defined as a reference point. The reference point of FIG. 1 is summarized in Table 1 below. In addition to the examples of Table 1, various reference points may exist according to a network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

The PDN GW corresponds to a termination point of a data interface towards a packet data network. The PDN GW may support policy enforcement features, packet filtering, charging support, or the like. In addition, it may serve as an anchor point for mobility management with a 3GPP network and a non-3GPP network (e.g., an untrusted network such as I-WLAN (Interworking Wireless Local Area Network), a trusted network such as CDMA (Code Division Multiple Access) network or Wimax).

Although it is illustrated in the example of the network architecture of FIG. 1 that the SGW and the PDN GW are shown as separate gateways, two gateways may be implemented according to a single gateway configuration option.

The MME is an element which performs signaling and control functions for supporting an access for a network connection of a terminal, an allocation of network resources, tracking, paging, roaming, handover, or the like. The MME controls control plane functions related to a subscriber and session management. The MME manages numerous eNodeBs and performs signaling for selection of the conventional gateways for handover for different 2G/3G networks. In addition, the MME performs functions such as security procedures, terminal-to-network session handling, idle terminal location management, or the like.

The SGSN handles all packet data such as user mobility management and authentication for different 3GPP networks (e.g., GPRS networks).

The e-PDG plays a role of a security node for a non-3GPP network (e.g., I-WLAN, WiFi, hotspot, etc.).

As can be seen from FIG. 1, a UE having an IP capability may have access to an IP service network (e.g., IMS)

Among the reference points shown in FIG. 1, S2a and S2b correspond to a non-3GPP interface. S2a is a reference point that provides a related control and mobility resource between a trusted non-3GPP access and a PDN GW to a user plane. S2b is a reference point that provides a related control and mobility support between an ePDG and a PDN GW to the user plane.

Figure 2:
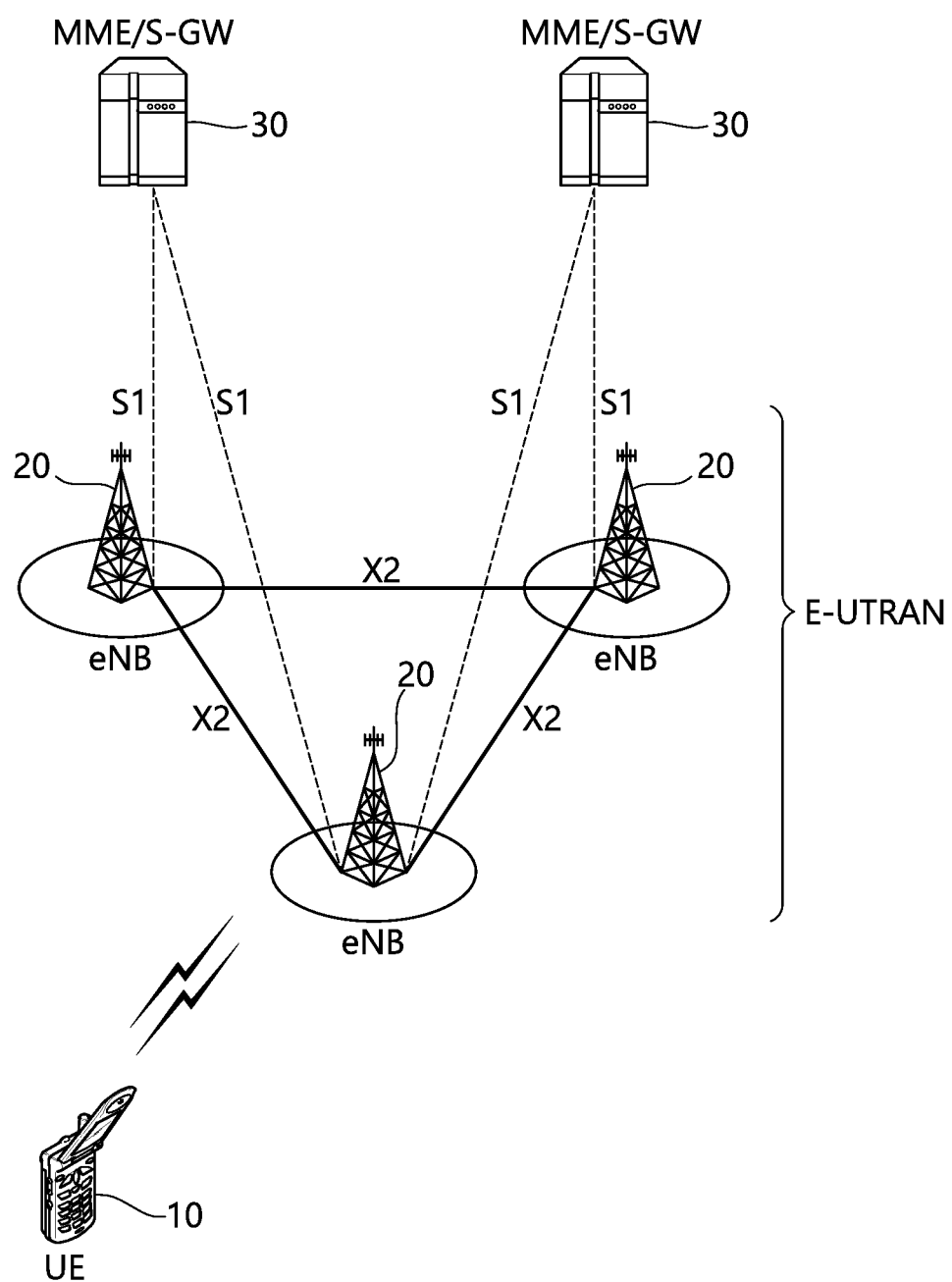
FIG. 2 shows a wireless communication system to which the present invention is applicable.

FIG. 2 shows a wireless communication system to which the present invention is applicable. The wireless communication system can also be called an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a gNB, etc. The gNB may refer to a BS in a new RAT (NR).

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as a termination point. The P-GW is a gateway having a PDN as a termination point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
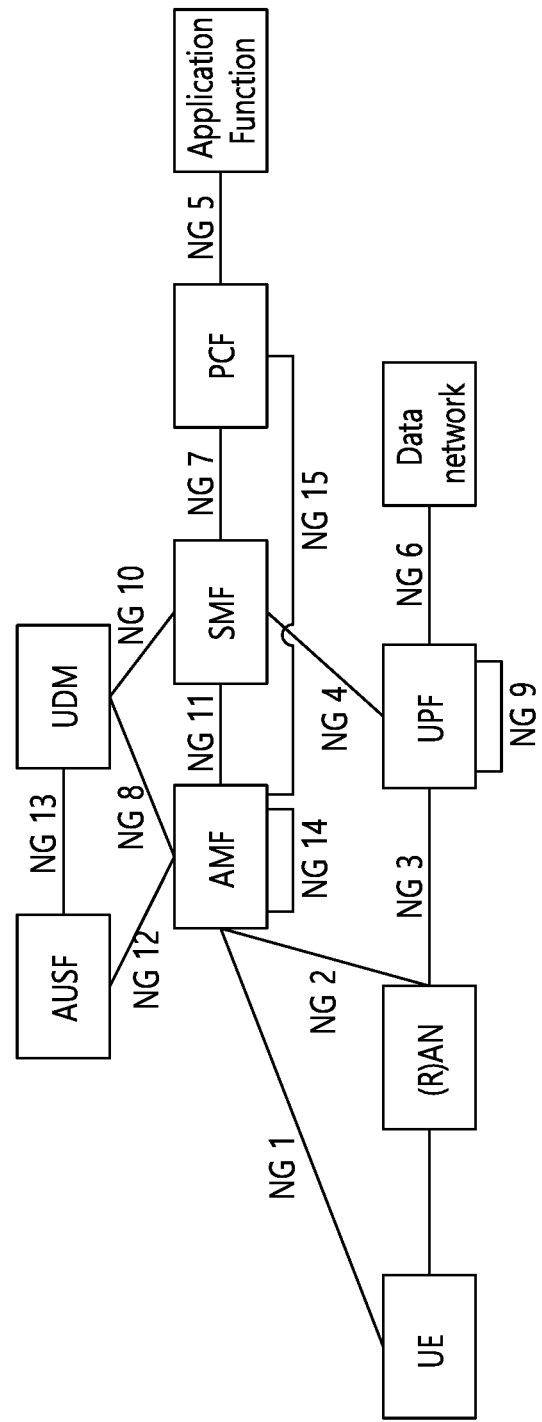
FIG. 3 exemplifies a next generation network based on a new RAT (NR) to which the present invention is applicable.

FIG. 3 exemplifies a next generation network based on a new RAT (NR) to which the present invention is applicable.

Referring to FIG. 3, in the next generation network, a function, a reference point, a protocol, or the like may be defined for each network function (NF) other than an entity.

A reference point between a BS (also referred to as RAN or AN when the RAN may be a BS using a new RAT and the AN may be a normal BS including a non-3GPP access technique such as Wi-Fi) and an access and mobility function (AMF) may be denoted by NG2 (or N2), and a reference point between the BS and a user plane function (UPF) may be denoted by NG3 (or N3).

The AMF may provide an access and mobility management function for access and mobility management in unit of a UE. The SMF may manage each session when the UE has several sessions. An application function may provide a policy control function (PCF) with information on a packet flow to ensure quality of service (QoS). Based on this, the PCF may determine a policy such as session management, mobility management, or the like and forward it to the AMF, the SMF, or the like, thereby performing appropriate mobility management, session management, QoS management, or the like. A data network forwards a protocol data unit (PDU) to be transmitted in a downlink direction to a UPF or receives a PDU transmitted by the UE via the UPF. A reference point between the two functions may be referred to as NG6 (or N6). An authentication server function (AUSF) stores data to authenticate the UE, and a user data management (UDM) may store subscription data, policy data, or the like of a user.

Figure 4:
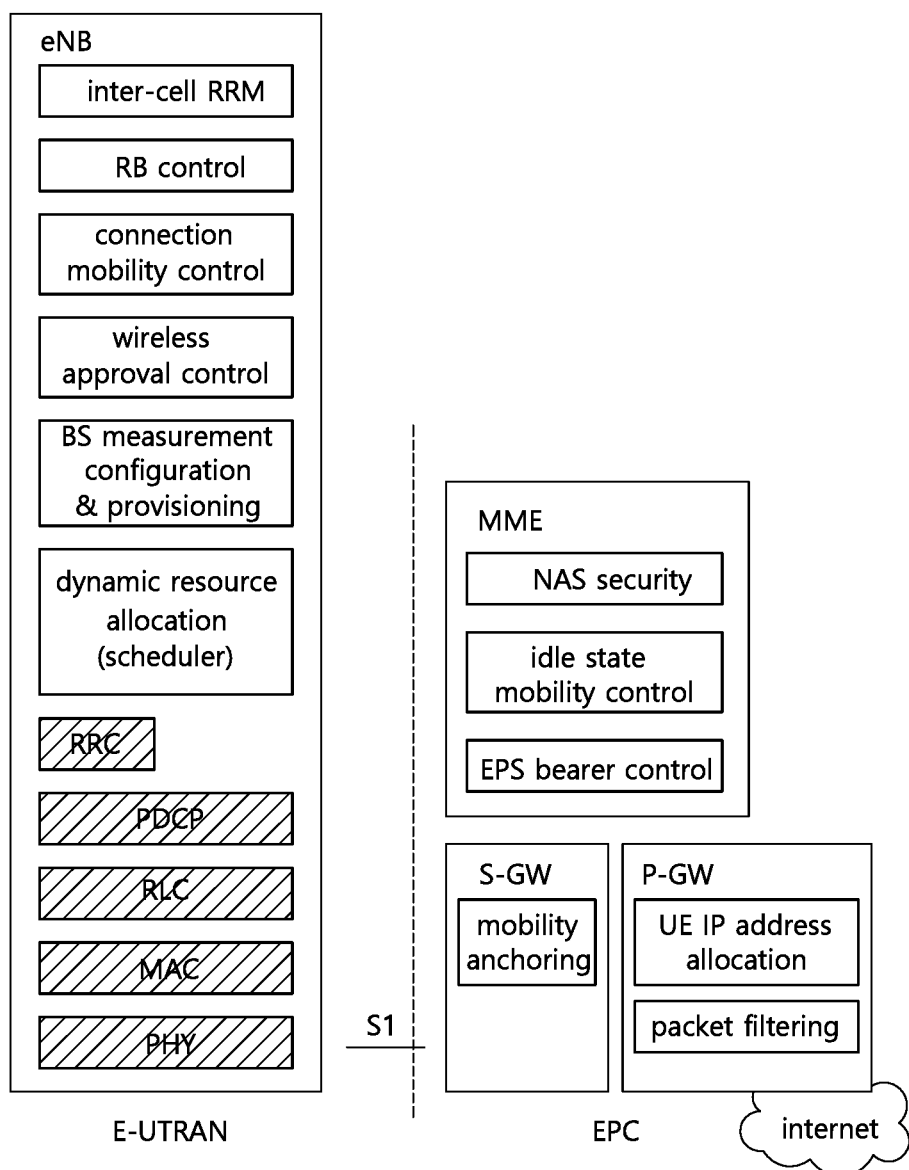
FIG. 4 exemplifies an architecture of an E-UTRAN and an EPC in a wireless communication system to which the present invention is applicable.

FIG. 4 exemplifies an architecture of an E-UTRAN and an EPC in a wireless communication system to which the present invention is applicable.

Referring to FIG. 4, an eNB may perform a function for selection of a gateway (e.g., MME), routing to the gateway during radio resource control (RRC) activation, scheduling and transmission of a broadcast channel (BCH), dynamical allocation of a resource to a UE in uplink and downlink, and mobility control connection in an LTE_ACTIVE state. As described above, the gateway in the EPC may perform a function for paging origination, LTE_IDEL state management, user plane ciphering, system architecture evolution (SAE) bearer control, NAS signaling ciphering, and integrity protection.

Meanwhile, although the following description focuses on the LTE/LTE-A system, the present invention is not limited thereto. That is, the present invention may apply to both the LTE/LTE-A system and the new RAT (NR) system, and may also apply to a case where the LTE/LTE-A system and the NR system coexist.

Figure 5:
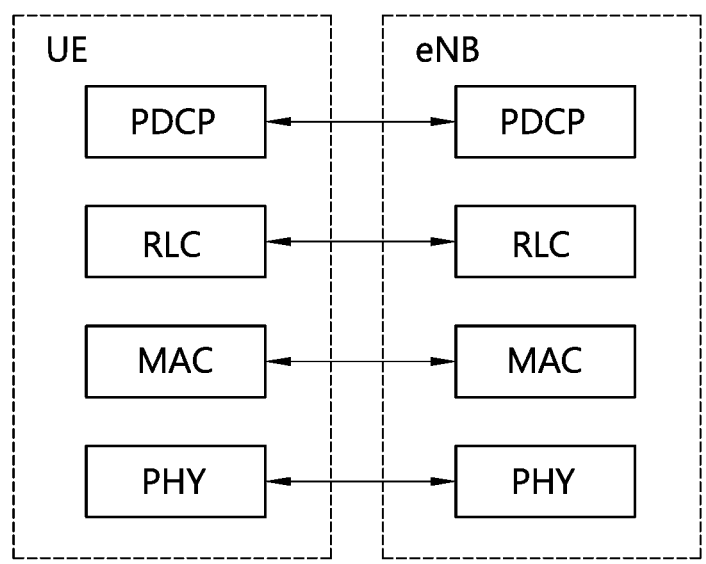
FIG. 5 is a diagram showing a radio protocol architecture for a user plane.
Figure 6:
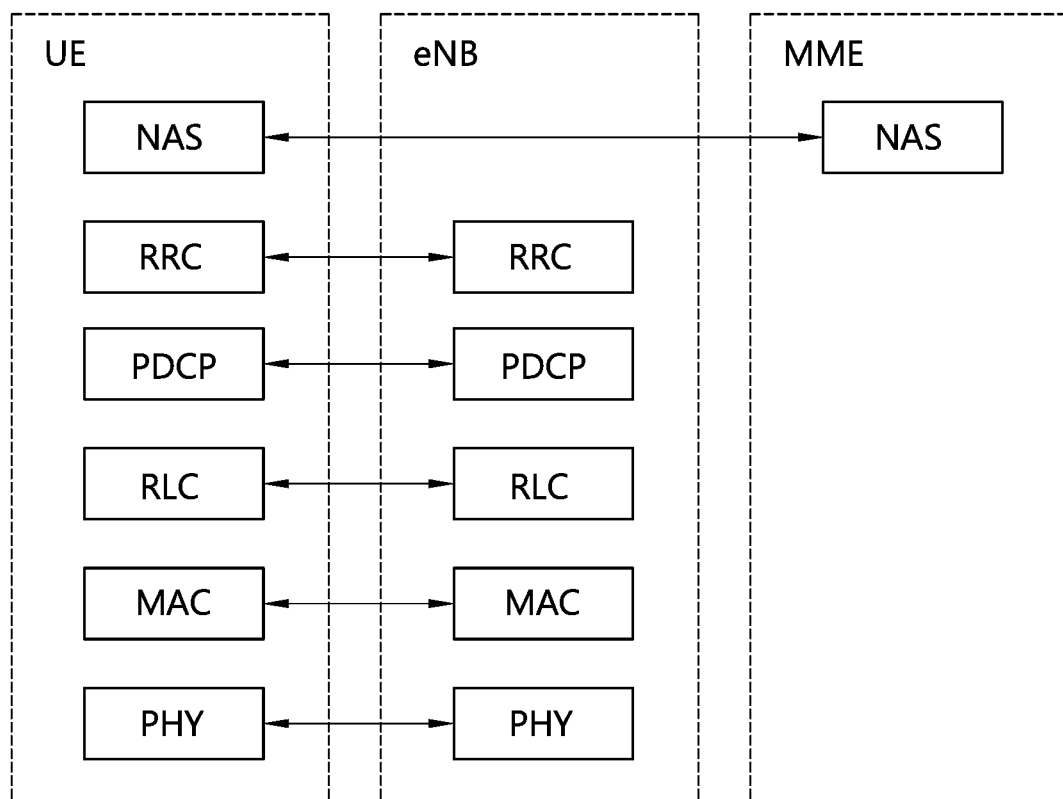
FIG. 6 is a diagram showing a radio protocol architecture for a control plane.

FIG. 5 is a diagram showing a radio protocol architecture for a user plane. FIG. 6 is a diagram showing a radio protocol architecture for a control plane. The user plane is a protocol stack for user data transmission. The control plane is a protocol stack for control signal transmission.

Referring to FIG. 5 and FIG. 6, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, re-configuration and release of radio bearers (RBs). An RB is a logical path provided by the first layer (i.e., PHY layer) and the second layer (i.e., MAC layer, RLC layer, and PDCP layer) for data transfer between the UE and the network.

A function of a packet data convergence protocol (PDCP) layer in the user plane includes user data transfer, header compression, and ciphering. A function of a PDCP layer in the control plane includes control-plane data transfer and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC-connected state, and otherwise the UE is in an RRC-idle state.

Examples of a downlink transport channel which transmits data from the network to the UE may include a broadcast channel (BCH) for transmitting system information and a downlink-shared channel (SCH) for transmitting user traffic or control messages. The traffic or control messages of downlink multicast or broadcast services may be transmitted on the downlink-SCH or an additional downlink multicast channel (MCH). Meanwhile, examples of an uplink transport channel which transmits data from the UE to the network include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel A transmission time interval (TTI) is a unit time of subframe transmission.

Figure 7:
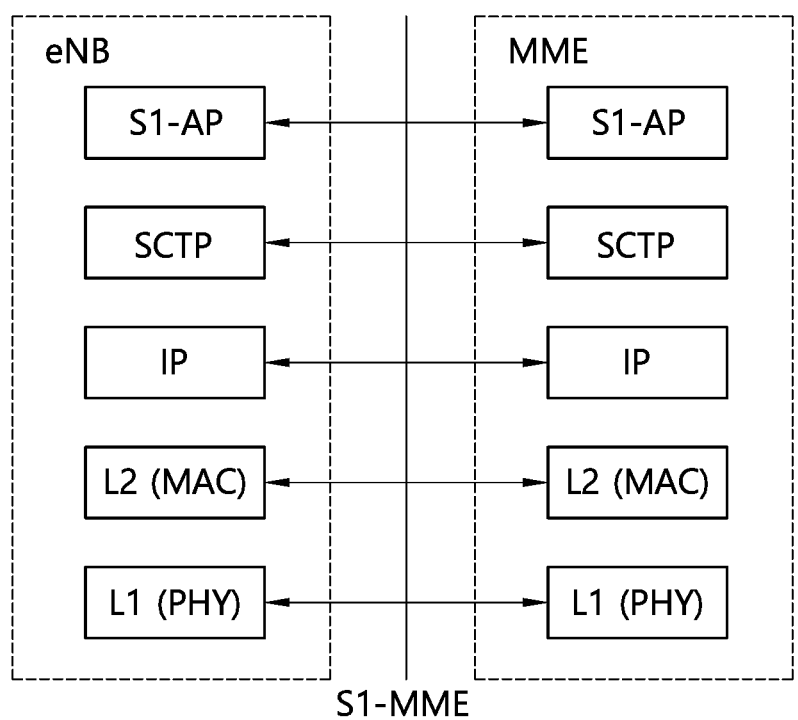
FIG. 7 and FIG. 8 show an S1 interface protocol structure in a wireless communication system to which the present invention is applicable.
Figure 8:
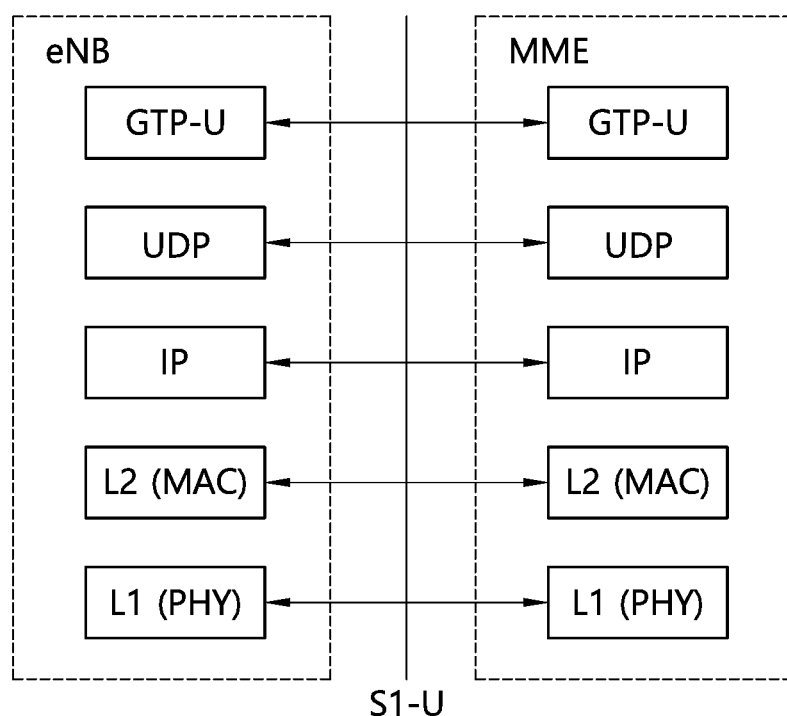

FIG. 7 and FIG. 8 show an S1 interface protocol structure in a wireless communication system to which the present invention is applicable.

FIG. 7 exemplifies a control plane protocol stack in an S1 interface, and FIG. 8 shows a user plane interface protocol structure in the S1 interface.

Referring to FIG. 7 and FIG. 8, an S1 control plane interface (S1-MME) is defined between an eNB and an MME. Similarly to a user plane, a transport network layer is based on IP transmission. However, for reliable transmission of message signaling, a stream control transmission protocol (SCTP) layer is added onto an IP layer. An application layer signaling protocol is referred to as an S1 application protocol (S1-AP).

S1-MME dedicated procedure, and an eNB communication context identifier is allocated for an eNB for the S1-MME dedicated procedure. The MME communication context identifier and the eNB communication context identifier are used to distinguish a UE-specific S1-MMe signaling transmission bearer. The communication context identifier is transferred within each S-AP message.

If an S1 signaling transport layer notifies to an S1AP layer that signaling is disconnected, the MME changes a state of the UE which has used the signaling connection to an ECM-IDLE state. In addition, the eNB releases an RRC connection of the UE.

An S1 user plane interface (S1-U) is defined between the eNB and the S-GW. The S1-U interface provides non-guaranteed transfer of the user plane PDU between the eNB and the S-GW. The transport network layer is based on IP transmission, and a GTP-U (GPRS Tunneling Protocol User Plane) layer which exists above a UDP/IP layer is used to transfer a user plane PDU between the eNB and the S-GW.

Hereinafter, an S1 paging procedure will be described.

The S1 paging procedure aims to enable an MME to page a UE in a specific eNB.

Figure 9:
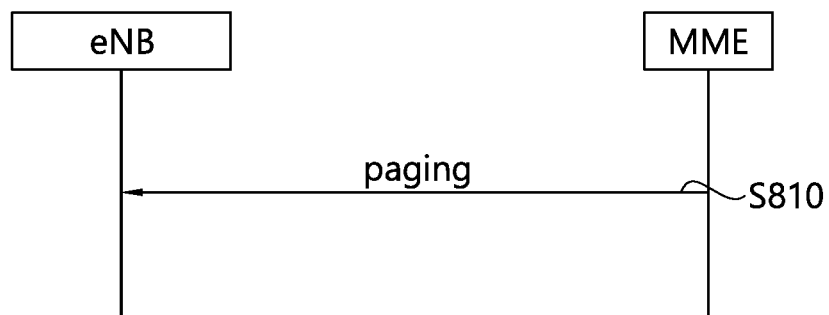
FIG. 9 is a flowchart showing an example of an S1 paging procedure.

FIG. 9 is a flowchart showing an example of an S1 paging procedure.

Referring to FIG. 9, an MME may transmit a paging message to an eNB (S810). More specifically, the MME initiates the paging procedure upon transmitting the paging message to the eNB. Upon receiving the paging message, the eNB may perform paging on the UE in cells related to tracking regions. The paging message may be as shown in Table 2 below.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |
| Assistance Data for Paging | O | | 9.2.1.x11 | | YES | ignore |

The SCTP layer provides guaranteed transfer of an application layer message.

For protocol data unit (PDU) signaling transmission, point-to-point transmission is used in a transport IP layer.

For each S1-MME interface instance, a single SCTP association uses a pair of stream identifiers for an S-MME common procedure. Only a pair of stream identifiers is used for an S1-MME dedicated procedure. An MME communication context identifier is allocated by an MME for the Herein, 'Message Type' may imply a type of a message to be transmitted. 'UE Identity Index value' may imply a UE identity index value. 'UE Paging Identity' implies an identity of a UE to be paged. 'Paging DRX (Discontinuous Reception)' may imply discontinuous reception for paging. 'CSG Id List' may imply an ID list for CSG (Closed Subscriber Group). 'Paging Priority' may imply a priority of paging. 'Assistance Data for Paging' may imply assistance information for paging.

Figure 10:
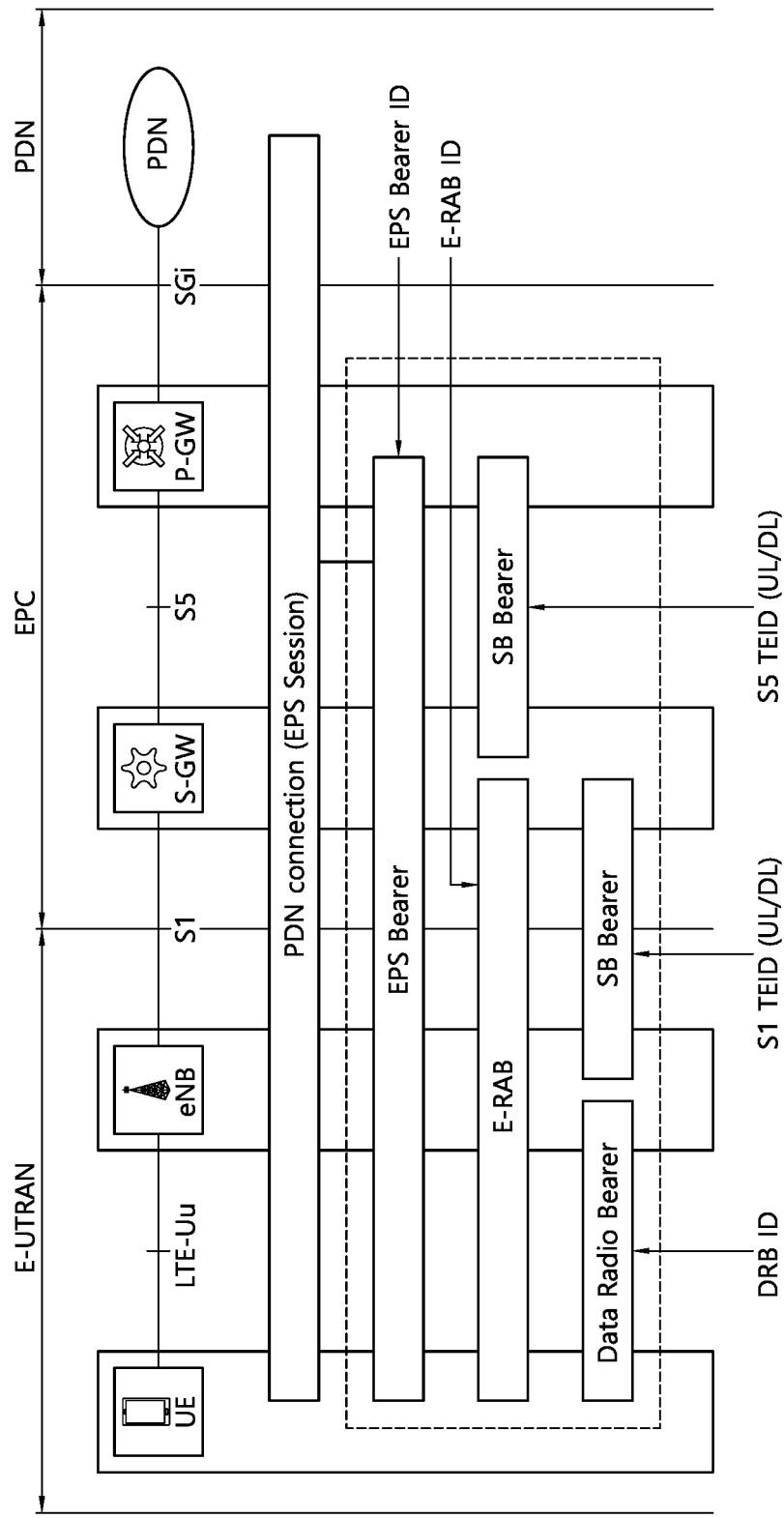
FIG. 10 exemplifies a bearer type and a name of an interface between respective entities of a network.

FIG. 10 exemplifies a bearer type and a name of an interface between respective entities of a network.

Referring to FIG. 10, a radio interface between a UE and an eNB is referred to as an LTE-Uu interface (simply referred to as a Uu interface). An interface between the eNB and an S-GW is referred to as an S1 interface, and an interface between the S-GW and a P-GW is referred to as an S5 interface. An interface between the P-GW and a PDN is referred to as SGi.

A bearer having the UE and the eNB as a termination point is referred to as a DRB (data radio bearer), and a bearer having the eNB and the S-GW as a termination point is referred to as an S1 bearer. A bearer having the UE and the S-GW as a termination point is referred to as an E-RAB (E-UTRAN Radio Access Bearer), and a bearer having the S-GW and the P-GW is referred to as an S5 bearer. A bearer having the UE and the P-GW as a termination point is referred to as an EPS (Evolved Packet System) bearer.

Now, a light connection will be described.

While a connection (e.g., RRC connection) between a UE and a BS (e.g., eNB) is deactivated, a UE in a light connection state may maintain a connection (e.g., S1 connection) between the BS and an MME.

The light connection is a new UE state which does not exist previously. That is, conventionally, there is a case 1) where both a connection (RRC connection) between a UE and a BS and a connection between the BS and an MME are deactivated, and a case 2) where both the connection (RRC connection) between the UE and the BS and the connection between the BS and the MME are activated. On the other hand, the light connection may be a case where the connection between the BS and the MME is maintained (activated) while deactivating the connection (RRC connection) between the UE and the BS. A context for the UE in the light connection state may be in a state of being stored in both the UE and the BS. The BS may be a BS (eNB or AN) which uses an E-UTRA (Evolved Universal Mobile Telecommunications System (UMTS) Terrestrial Radio Access) or a BS (gNB or RAN) which uses a new radio access scheme (NR). When the BS is a BS which uses the NR scheme, an AMF (Access and Mobility Function) may correspond to the MME. That is, in an LTE/LTE-A system, a connection between a BS (eNB) and an MME may correspond to a connection between a BS (gNB) and an AMF (hereinafter, the same applies).

As such, in the light connection state, the connection between the UE and the BS is deactivated whereas the connection between the BS and the MME (in case of NR, between the BS and the AMF, hereinafter, the same applies) is activated. Therefore, when downlink data arrives, the MME may directly transmit the downlink data to an anchor BS (e.g., eNB, and in case of NR, gNB) without having to newly transmit an S1/(in case of new RAT, NG, hereinafter, the same applies) paging message to the BS. Accordingly, a signaling overhead caused by frequent transmission of the S1/(NG) paging message can be decreased. The anchor BS may first buffer the received downlink data, and then may trigger paging to the UE through a Uu interface.

The anchor BS may be a BS which has a UE context and maintains an S1 connection with the MME. The anchor BS may be a BS which is in a state where a connection (e.g., RRC connection) with the UE is deactivated but maintains a connection (e.g., S1 connection) with the MME.

On the other hand, since the UE has mobility, the UE may move into coverage of a different BS while being located in coverage of an anchor base station. In this case, the anchor BS may transmit an X2/(in case of new RAT, Xn) paging request message to neighboring BSs.

The neighboring BSs which have received the X2/Xn paging request message from the anchor BS may transmit the paging message to the UE through the Uu interface.

If the UE responds to the paging message transmitted by a different BS, the different BS (e.g., BS 2) which has received the response may transmit an X2/Xn paging response message to the anchor BS. Accordingly, the anchor BS may be informed that the UE exists in the coverage of the BS 2.

Then, the anchor BS needs to transfer downlink data to the UE via the BS 2. The present invention specifies a process of transferring downlink data for the UE which is in a light connection state between the anchor BS and the neighboring BS. As described above, since the UE in the light connection state is a UE which does not exist previously, the process of transferring data for the UE which is in the light connection state is also a new method which does not exist previously.

The most important operations of the present invention are first described, and then various embodiments to which the present invention is applicable are described.

Figure 11:
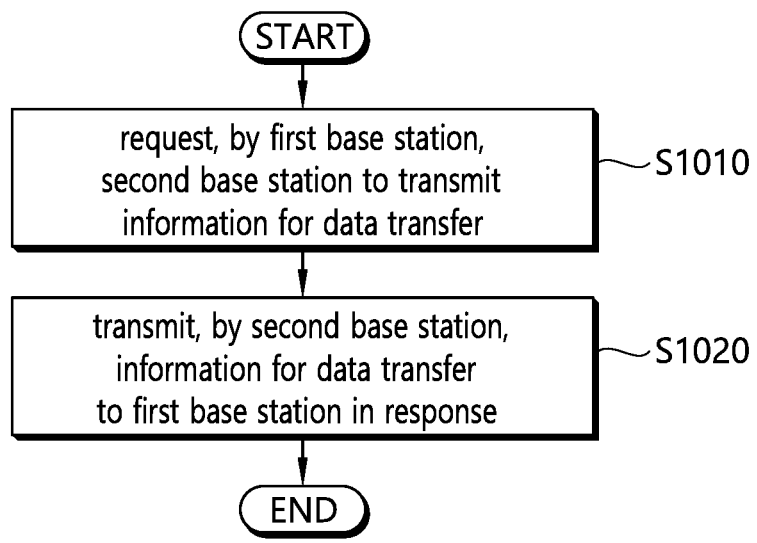
FIG. 11 shows a method of transferring data according to the present invention.

FIG. 11 shows a method of transferring data according to the present invention.

Referring to FIG. 11, a first BS requests a second BS to transmit information for data transfer (S1010). The information for data transfer may be, for example, a request of a downlink GTP tunnel endpoint IE. The GTP tunnel may be a path for data transfer between the BS and a P-GW.

The second BS responds to the first BS with the information for data transfer (S1020). For example, the second BS may transmit the downlink GTP tunnel endpoint IE to the first BS in response thereto.

Now, a specific example of applying the method of FIG. 11 will be described.

Figure 12:
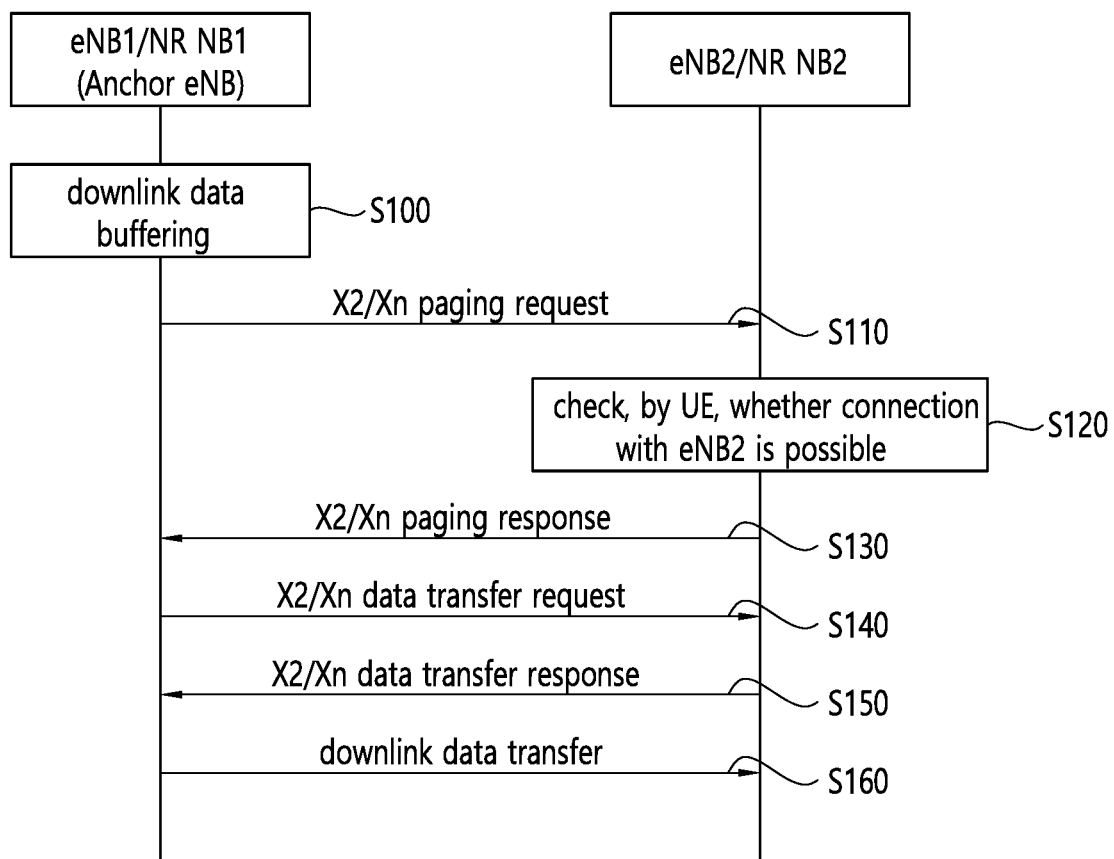
FIG. 12 exemplifies an embodiment to which the present invention is applied.

FIG. 12 exemplifies an embodiment to which the present invention is applied.

Referring to FIG. 12, an eNB 1 may be an anchor eNB. The eNB 1 may buffer downlink data received from an S-GW (S100). In NR, the eNB 1 may be referred to as a gNB 1.

The eNB 1 transmits an X2 (LTE/LTE-A system)/Xn (NR system) paging request message (or existing message) to neighboring eNBs (S110). For example, the eNB 1 may transmit the X2/Xn paging request message to the neighboring eNBs such as eNB 2, 3, 4, etc. The eNB 2 is exemplified as the neighboring eNBs in FIG. 12.

Upon receiving the X2/Xn paging request message, the eNB 2 checks whether a connection with a UE is possible (S120). For example, if a paging message is transmitted and the UE receives a response in response thereto, the eNB 2 may determine that the connection with the UE is possible.

Upon determining that the connection with the UE is possible, the eNB 2 transmits an X2/Xn paging response message to the eNB 1 which is an anchor eNB (S130). The X2/Xn paging response message may include a UE ID (eNB2 UE X2AP ID) allocated by the eNB 2.

The anchor eNB (eNB 1) which has received the X2/Xn paging response message from each of neighboring eNB determines a specific eNB having coverage in which the UE exists. In the example of FIG. 12, the eNB 1 may determine that the UE exists in the coverage of the eNB 2 through the X2/Xn paging response message. If the eNB 2 determines that the connection with the UE is possible, the anchor eNB may determine to transfer buffered data to the UE via the eNB 2.

To trigger a process of transferring X2/Xn data, the eNB 1 which is the anchor eNB transmits an X2/Xn data transfer request message to the eNB 2 which is a neighboring eNB (S140). The X2/Xn data transfer request message may include at least one of E-RAB (E-UTRAN Radio Access Bearer) ID and E-RAB level QoS (Quality of Service) parameter IE (Information Element). The E-RAB is a bearer in which a UE and an S-GW serve as a termination point, and may consist of a DRB (Data Radio Bearer) and an S1 bearer. The E-RAB level QoS parameter may indicate QoS-related information regarding downlink data to be delivered to the eNB 2.

In addition, the anchor eNB may allow the X2/Xn data transfer request message to include a UL GTP tunnel endpoint IE. The GTP tunnel may be path used to transfer an IP packet transmitted by the UE, to the P-GW from the eNB. The UL GTP tunnel endpoint IE may include information regarding an endpoint of the GTP tunnel.

On the basis of the QoS-related information, the eNB 2 may check whether there is a need to reserve resources required for downlink data to be transferred from the anchor eNB.

The eNB 2 may transmit the X2/Xn data transfer response message including the downlink GTP tunnel endpoint IE (S150). Upon receiving the X2/Xn data transfer request message, the eNB 2 may know that downlink data exists in the eNB 1, and based on this, may transmit the downlink GTP tunnel endpoint IE to the eNB 1.

In addition, the eNB 2 may inform E-RABs allowed in an E-RABs admitted list IE. In addition, a cause value indicating a cause of not allowing E-RABs not allowed in the E-RABs not admitted list IE may be informed together.

The eNB 1 as the anchor eNB transmits downlink data to the eNB 2 (S160). That is, the eNB 1 may transfer downlink data for a specific UE through information exchange with the eNB 2.

Figure 13:
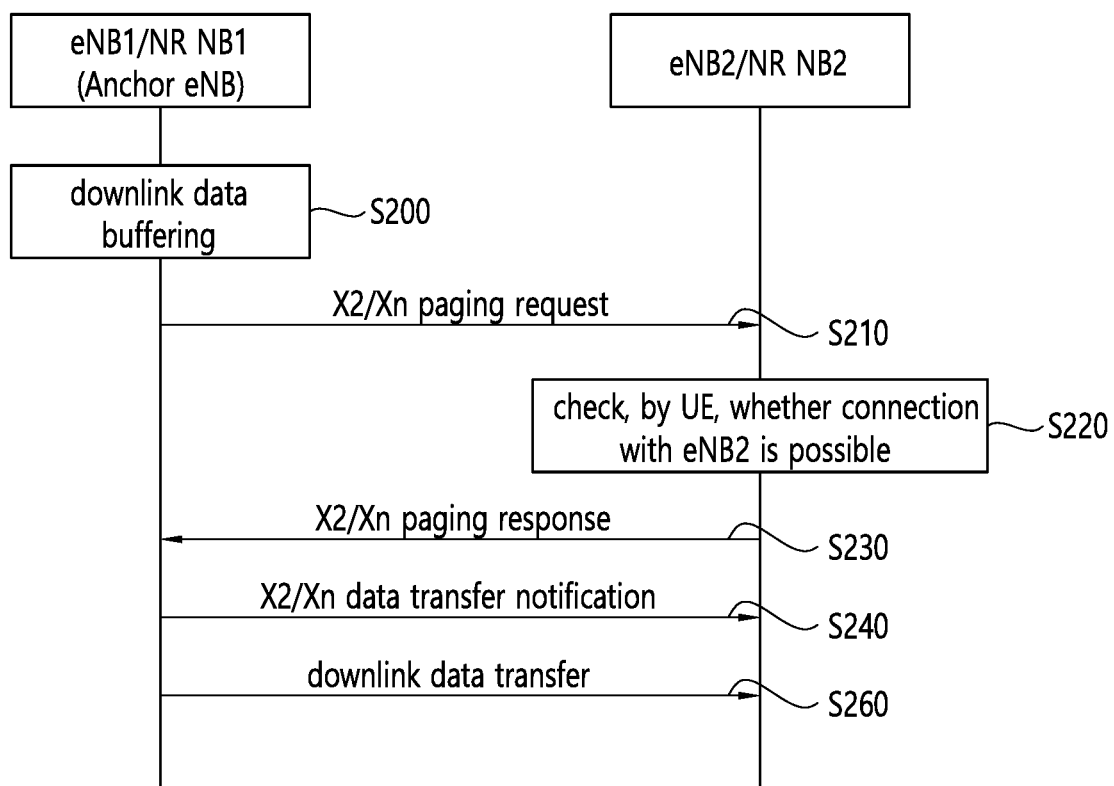
FIG. 13 exemplifies another embodiment to which the present invention is applied.

FIG. 13 exemplifies another embodiment to which the present invention is applied.

Referring to FIG. 13, an eNB 1 may be an anchor eNB. The eNB 1 may buffer downlink data received from an S-GW (S200).

The eNB 1 which is the anchor eNB transmits an X2/Xn paging request message (or a new message) to neighboring eNBs (S210). As an example of the neighboring eNB, an eNB 2 is exemplified in FIG. 13.

Upon receiving the X2/Xn paging request message, the eNB 2 checks whether a connection with a UE is possible (S220). For example, if a paging message is transmitted and the UE receives a response in response thereto, the eNB 2 may determine that the connection with the UE is possible.

Upon determining that the connection with the UE is possible, the eNB 2 transmits an X2/Xn paging response message to the eNB 1 which is an anchor eNB (S230). The X2/Xn paging response message may include a UE ID (eNB2 UE X2AP ID) allocated by the eNB 2 and information regarding the downlink GTP tunnel endpoint.

The anchor eNB (eNB 1) which has received the X2/Xn paging response message may identify whether the UE exists in the coverage of the eNB 2. If the eNB 2 determines that the connection with the UE is possible, the anchor eNB (eNB 1) may determine to transfer buffered data to the UE via the eNB 2.

To trigger a process of transferring X2/Xn data, the eNB 1 which is the anchor eNB transmits an X2/Xn data transfer notification message to the eNB 2 which is a neighboring eNB (S240). The X2/Xn data transfer request message may include at least one of E-RAB (E-UTRAN Radio Access Bearer) ID and E-RAB level QoS (Quality of Service) parameter IE (Information Element). The E-RAB level QoS parameter may indicate QoS-related information regarding downlink data to be transferred to the eNB 2. On the basis of the E-RAB level QoS parameter IE, the eNB 2 may prepare resources required for downlink data to be transferred from the anchor eNB.

In addition, the anchor eNB may allow the X2/Xn data transfer notification message to include a UL GTP tunnel endpoint IE. The GTP tunnel may be path used to transfer an IP packet transmitted by the UE, to the P-GW from the eNB.

The eNB which is the anchor eNB transmits downlink data to the eNB 2 (S250).

Figure 14:
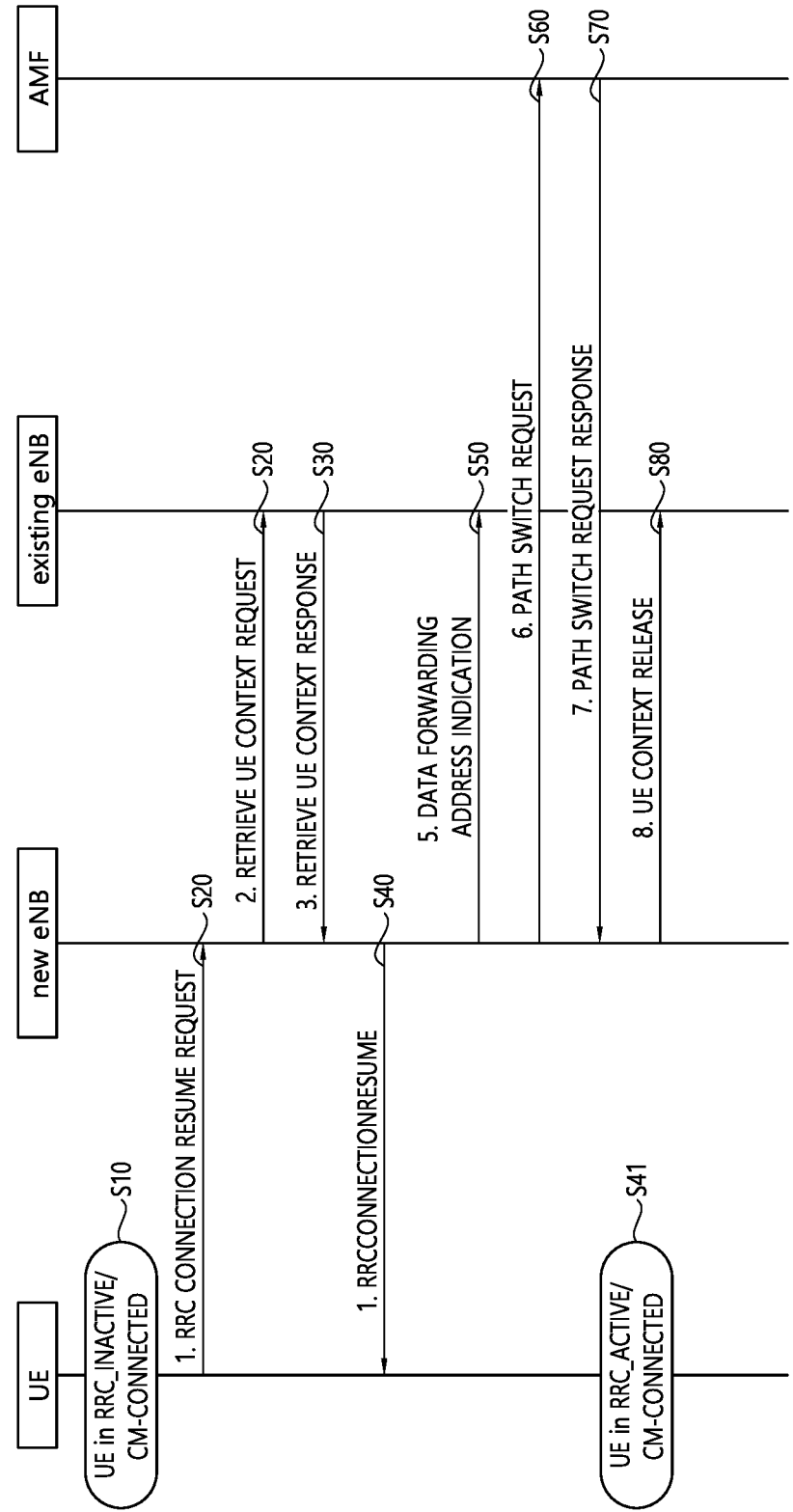
FIG. 14 explains a modified example to which the present invention is applied.

FIG. 14 explains a modified example to which the present invention is applied.

Referring to FIG. 14, a UE may be in a light connection state (S10). That is, the UE may be in a state where an RRC connection is in an inactive state (RRC_INACTIVE state), and an S1 connection (or in case of NR, NG2 connection) is in a maintained state (CM-CONNECTED state).

The UE may move into coverage of a new eNB from coverage of an existing eNB. In this case, the UE may transmit an RRCConnectionResumeRequest message to the new eNB (S20).

The new eNB may transmit a retrieve UE context request to the existing eNB (S20). The retrieve UE context request is transmitted in order for the new eNB which has received an RRC connection resume request message from the UE to retrieve UE context for the UE from the existing eNB which has transitioned to an RRC inactive state for the UE.

The existing eNB, which has received a request for providing UE context data, provides the UE context data to the new eNB (S30). That is, the new eNB receives a retrieve UE context message from the existing eNB. In this case, the existing eNB may allow the retrieve UE context response message to include indication information (or indicator) indicating a presence of downlink data which is being buffered. The new eNB which has received the retrieve UE context response message including the indication information (or indicator) may transmit a 'data forwarding address indication' message (S50). This process, that is, the steps S30 and S50 of FIG. 14 corresponds to steps corresponding to S140 and S150 of FIG. 12. The 'data forwarding address indication' message may correspond to a downlink GTP tunnel endpoint IE.

Meanwhile, although not shown in FIG. 14, the existing eNB may transmit a failure message for the retrieve UE context request (the message is called a retrieve UE context failure).

The new eNB completes a process of resuming an RRC connection with the UE (S40). Then, the UE becomes a CM-CONNECTED state in which an S1 connection (in case of NR, NG2 connection) is maintained while in an RRC_ACTIVE state (S41).

As described above, the new eNB may inform the existing eNB of a data forwarding address (S50). The new eNB may inform the existing eNB of contexts which are related to resources and by which downlink data pending in the existing eNB can be transferred, and the contexts may be included in a "data forwarding address indication" message. The existing eNB which has received the "data forwarding address indication" message may forward the downlink data to an indicated address.

The new eNB requests an AMF (Access and Mobility Function) to perform path switching (S60), and upon receiving a path switch request response in response thereto (S700), triggers the existing eNB to release a UE context (S80). The AMF may perform a role similar to an MME of the existing system. Then, the existing eNB may release resources for the UE.

General Details of an Apparatus to which the Present Invention is Applicable

Figure 15:
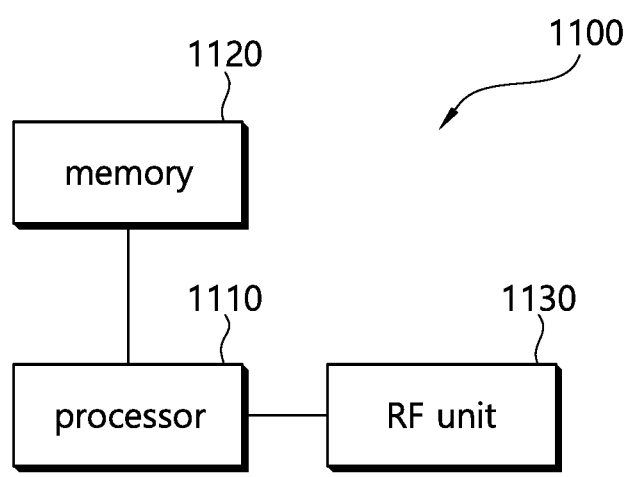
FIG. 15 exemplifies a block diagram of a communication device according to an embodiment of the present invention.

FIG. 15 exemplifies a block diagram of a communication device according to an embodiment of the present invention.

Referring to FIG. 15, a communication device 1100 includes a processor 1110, a memory 1120, and a radio frequency (RF) unit 1130.

The processor 1110 may perform functions/operations/methods described in the present invention. For example, the processor 1110 may transmit a message requesting information for data transfer to a different BS, and may receive, from the different BS, a response message for the message requesting the information for data transfer. In this case, the information for data transfer is for transferring data on a UE in a light connection state.

The communication device 1100 may be a BS (eNB) operating in an LTE/LTE-A system, a BS (gNB) operating in an NR system, or a UE operating in the LTE/LTE-A system or the NR system.

Layers of a wired/wireless interface protocol may be implemented by the processor 1110. The memory 1120 is coupled to the processor 1110 to store a variety of information for driving the processor 1110. The RF unit 1130 may function as a communication module, and may be coupled to the processor 1110 to transmit and/or receive a wired/wireless signal.

The memory 1120 may be disposed to the processor 1110 internally or externally, and may be connected to the processor 1110 using a variety of well-known means. The RF unit 1130 may have a single antenna or multiple antennas.

Embodiments according to the present invention may be implemented by various means, for example, hardware, firmware, software, or a combination thereof. In the case of hardware implementation, an embodiment of the present invention may be implemented by one or more application specific integrated circuits (ASICs), digital signal processors (DSPs), digital signal processing devices (DSPDs), programmable logic devices (PLDs) field programmable gate arrays), a processor, a controller, a microcontroller, a microprocessor, and the like.

In the case of an implementation by firmware or software, an embodiment of the present invention may be implemented in the form of a module, a procedure, a function, or the like for performing the functions or operations described above. The software code may be stored in memory and driven by the processor. The memory is located inside or outside the processor and can exchange data with the processor by various means already known.

What is claimed is:

1. A method of operating a base station in a wireless communication system, the method comprising:
   transmitting, to another base station, a first message requesting information for data transfer, wherein the first message includes an identity (ID) related to a user equipment (UE);
   receiving, from the another base station, a second message including the information for the data transfer as a response to the first message;
   transmitting, to the another base station, address information; and
   receiving, from the another base station, data related to the UE pending at the another base station based on the address information,
   wherein, by transmitting the address information, the base station informs the another base station of resource contexts to which the data related to the UE pending at the another base station can be forwarded to the base station.

2. The method of claim 1, wherein the UE is in a light connection state and the UE in the light connection state is a UE for which a radio resource control (RRC) connection with the another base station is deactivated and a connection state with a core network (CN) is maintained.

3. The method of claim 1, wherein the base station performs a RRC connection procedure with the UE.

4. The method of claim 1, wherein the another base station is a last serving base station of the UE.

5. A base station comprising:
   a transceiver for transmitting and receiving a radio signal; and
   a processor operatively coupled to the transceiver,
   wherein the processor is configured to:
   transmit, to another base station, a first message requesting information for data transfer, wherein the first message includes an identity (ID) related to a user equipment (UE);
   receive, from the another base station, a second message including the information for the data transfer as a response to the first message;
   transmit, to the another base station, address information; and
   receive, from the another base station, data related to the UE pending at the another base station based on the address information,
   wherein, by transmitting the address information, the base station informs the another base station of resource contexts to which the data related to the UE pending at the another base station can be forwarded to the base station.

6. The base station of claim 5, wherein the UE is in a light connection state and the UE in the light connection state is a UE for which a radio resource control (RRC) connection with the another base station is deactivated and a connection state with a core network (CN) is maintained.

7. The base station of claim 5, wherein the base station performs a RRC connection procedure with the UE.

8. The base station of claim 5, wherein the another base station is a last serving base station of the UE.

9. A method for transmitting a radio resource control (RRC) message in a wireless communication system, the method performed by a user equipment (UE) and comprising:
   transmitting, to a base station, the RRC message which triggers the base station to transmit a first message,
   wherein the first message requests information for data transfer,
   wherein the first message includes an identity (ID) related to the UE,
   wherein a second message including the information for the data transfer is received to the base station as a response to the first message from another base station,
   wherein address information is transmitted to the another base station from the base station,
   wherein a data related to the UE pending at the another base station is received to the base station based on the address information from the another base station, and
   wherein, based on the address information being transmitted, resource contexts to which the data related to the UE pending at the another base station can be forwarded to the base station is informed.

10. The method of claim 9, wherein the UE is in a light connection state and the UE in the light connection state is a UE for which a radio resource control (RRC) connection with the another base station is deactivated and a connection state with a core network (CN) is maintained.

11. The method of claim 9, wherein the apparatus performs a RRC connection procedure with the UE.

12. The method of claim 9, wherein the another base station is a last serving base station of the UE.

\* \* \* \* \*